(12) United States Patent
Roth (10) Patent No.: US 9,906,919 B2
(45) Date of Patent: *Feb. 27, 2018

(54) DATA LOCATOR TECHNOLOGY

(71) Applicant: Denise Roth, Palm Springs, CA (US)

(72) Inventor: Denise Roth, Palm Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,505

(22) Filed: Nov. 30, 2016

(65) Prior Publication Data

US 2017/0086031 A1    Mar. 23, 2017

Related U.S. Application Data

(62) Division of application No. 14/664,757, filed on Mar. 20, 2015, now Pat. No. 9,532,183.

(Continued)

(51) Int. Cl.
| | |
|---|---|
| *H04B 7/00* | (2006.01) |
| *H04W 4/04* | (2009.01) |
| *G06Q 50/20* | (2012.01) |
| *H04B 17/318* | (2015.01) |
| *H04L 9/06* | (2006.01) |
| *H04L 12/26* | (2006.01) |

(Continued)

(52) U.S. Cl.
CPC ............ *H04W 4/04* (2013.01); *G06Q 50/205* (2013.01); *H04B 17/318* (2015.01); *H04L 9/0631* (2013.01); *H04L 43/08* (2013.01); *H04L 67/02* (2013.01); *H04W 84/18* (2013.01)

(58) Field of Classification Search
CPC ....... H04W 4/04; H04W 8/205; H04W 84/18; G06Q 50/205
See application file for complete search history.

(56) References Cited

U.S. PATENT DOCUMENTS 8,353,705 B2 *  1/2013  Dobson ............... G07C 9/00111
                                                  340/10.1
2002/0132612 A1   9/2002  Ishii
(Continued)

OTHER PUBLICATIONS

Wedberg, "Companies Deliver New Apps for Bluetooth Beacons", RFID Journal, Oct. 7, 2013, www.rfidjournal.com, RFID Journal LLC, Hauppauge, NY.

(Continued)

*Primary Examiner* — Tuan Pham
(74) *Attorney, Agent, or Firm* — Fulwider Patton LLP (57) ABSTRACT

A system and method are provided for determining students that are in danger of dropping out of an educational institution, and for delivering Internet content. The system and method gathers behavioral data of users using wireless beacon technology, a Wi-Fi capture device and mobile communications devices by monitoring a user's engagement with campus life and class attendance. As a user's focus changes from active participation in campus life to dropping out of the educational institution, their behavior changes, and the system and method captures this change through their participation in student life. The system and method further allows educational institutions and other information providers to use location beacons to link objects, locations, persons, or pets to information such as web links directing to Internet content, and to deliver such information to a user's mobile communications device.

19 Claims, 6 Drawing Sheets

Related U.S. Application Data (60) Provisional application No. 61/977,453, filed on Apr. 9, 2014.

(51) Int. Cl.
    *H04L 29/08*     (2006.01)
    *H04W 84/18*     (2009.01)

(56) References Cited

U.S. PATENT DOCUMENTS

| | | |
|---|---|---|
| 2004/0143497 A1 | 7/2004 | Hayashi et al. |
| 2008/0113614 A1 | 5/2008 | Rosenblatt |
| 2013/0091246 A1 | 4/2013 | Urbanski |
| 2013/0226704 A1 | 8/2013 | Fernandez |
| 2013/0281084 A1 | 10/2013 | Batada et al. |
| 2013/0332208 A1 | 12/2013 | Mehta |
| 2014/0269478 A1 | 9/2014 | Choi et al. |
| 2014/0269479 A1 * | 9/2014 | Damnjanovic ....... H04W 52/24 370/311 |
| 2015/0006499 A1 * | 1/2015 | Stewart ............. G06F 17/30864 707/706 |
| 2015/0120362 A1 | 4/2015 | Whorley, Jr. et al. |

OTHER PUBLICATIONS

Betters, "Apple's iBeacons Explained: What It Is and Why It Matters", Pocket-lint.com, Sep. 18, 2013, <http://www.pocket-lint.com/news/123730-apple-s-ibeacons-explained-what-it-is-and-why-it-matters>, Pocket-lint.com, Ascot, United Kingdom.

\* cited by examiner

DATA LOCATOR TECHNOLOGY

CROSS-REFERENCES TO RELATED APPLICATIONS

This application is a divisional of U.S. application Ser. No. 14/664,757, filed Mar. 20, 2015, which claims priority from U.S. Provisional Application No. 61/977,453, filed Apr. 9, 2014, which are incorporated by reference in their entirety.

BACKGROUND

This invention generally relates to location beacons and a Wi-Fi connection capture device, and more particularly relates to wireless systems and methods for determining the chances that a user drops out of an educational institution, and for delivering Internet content, such as advertising information, a coupon, video, or picture, by providing information associated with a location beacon to a mobile communications device of a user that is in proximity with the location beacon.

Colleges and universities are under intense pressure to control rising costs and, in turn, rising tuition. One very important factor, and one where the educational institution can have significant control and impact, is student retention, namely how to keep students on campus after their initial enrollment. Dropout rates at United States colleges and universities can approach 46%, with lost revenues and costs approaching $16,000,000,000 a year.

There have been numerous studies that isolate key factors that can influence student retention rates. They can range from analyzing SAT scores to parental involvement with hundreds of factors in between. These factors also vary greatly from institution to institution, depending on student demographics and the institutional mission, goals and policies. With such numerous possibilities existing, it is currently difficult for an educational institution to easily determine the chances of a student dropping out of a college or university. Therefore, it is desirable to find a new and unique approach to determine the chances that a user drops out of an educational institution. One such new and unique approach involves the use of location beacons and a Wi-Fi capture method.

The advent of Bluetooth Low Energy (BLE) communications technology has allowed for the development of wireless transmitters to be used as location beacons. This technology allows for ascertaining the proximity of a mobile communications device to an individual location beacon by determining the strength of a signal transmitted from the location beacon, a feature which can also be used for determining the geo-location of the mobile communications device. Moreover, location beacons are prevalently used for interacting with a mobile communication device, with applications including identification of an individual location beacon, identification of an individual mobile communications device, and facilitating communication between them through mobile communications device software.

For example, personal media devices with wireless communication are known that have the ability to communicate wirelessly using a short-range communications protocol to provide access to wireless oriented applications, such as to wirelessly download a podcast when it becomes available, or to provide content specific or local to a merchant to personal media devices in wireless communication with a wireless router affiliated with the merchant, such as a restaurant menu. Such systems can also be utilized to maintain a wait list for customers waiting to use a physical resource, such as a table at the restaurant, and dynamic updating of wait times.

Such interaction is typically facilitated by communication with a server through the Internet. Typically the mobile communications device, such as a mobile phone, for example, submits a beacon contact or identifier to the server when the mobile phone is proximate to the location beacon. The server interprets and identifies the location of the beacon, such as a particular retail space, and then communicates information related to the identified retail space, such as advertising or coupons, to the mobile phone.

For example, a system is known that includes a sensor adapted to transmit a wireless beacon signal including a sensor ID associated with the sensor, a mobile device adapted to receive the wireless beacon signal and provide a location of the mobile device, and a server adapted to receive the location of the mobile device and the sensor ID, generate instructions based at least partly on the received information, and send the instructions to the mobile device.

As another example, a short range wireless beacon system is known that includes a mobile station that detects entry into an area utilizing short range or near field radio-frequency beacon signals from a short range wireless beacon located in the area. The mobile station transmits an identifier from the beacon signal to a location server that determines the location of the mobile station, and presents the user with a map of the area showing the location of the mobile station within the area, or identifies the user to personnel at the area to customize customer interactions.

However, these types of client-server systems can be very resource-intensive and potentially costly. In comparison to a central server computer, with large database capacity, processing capability, and a steady reliable source of power, a client mobile communications device, such as a mobile phone or smartphone, has limited storage capacity and limited battery power. Therefore, such systems rely on the central server computer to provide the resources necessary for processing data from a location beacon or Wi-Fi source, including interpreting and identifying an object or location associated with the location beacon, searching a database for Internet content to deliver that is related to the object or location associated with the location beacon, and delivering the Internet content relating to that object or location on the mobile phone, such as advertisements, coupons, videos, pictures, maps, restaurant menus, websites, or applications. Such content, especially videos, require a large amount of data to transfer from the server to the mobile phone, and when the location beacon is positioned in a densely populated area with hundreds or thousands of simultaneously proximate mobile phones, such as a major baseball stadium, high bandwidth usage can result from the delivery of this content. Such systems can prove costly to beacon application developers in maintaining sufficient bandwidth and in keeping their systems and servers up and running, particularly when multiple location beacons are used in densely populated areas. Therefore, it is desirable to provide a wireless beacon system and method that is both resource-effective and cost-effective.

Furthermore, typical location beacon technology systems require the download and use of location beacon technology software specific to an individual location, store, chain or other information provider on individual mobile communications devices. A user must typically download and install an application utilizing the location beacon technology on his or her mobile communications device before the location beacon technology system can work. If the user then enters another location managed by a separate information provider, the user must download and install a separate application. As a result, users are required to download and install multiple, separate software downloads that are specific to respective locations, stores, chains or other information providers if they want to receive location based services from different providers. Such a requirement becomes essentially unworkable as the number of information providers grows, for users may have to download and install tens and hundreds of applications onto their mobile phones to account for all information providers of interest. This practice may not only discourage users from using location beacon technology, but also use a large amount of storage and battery on the mobile communications device. Therefore, it is desirable to provide a wireless beacon system and method that efficiently provides individual applications for mobile communications devices with location based services from multiple locations, stores, chains or other information providers utilizing location beacon technology.

In addition, location beacon technology systems are typically platform restrictive. A location beacon typically requires a unique identifier to distinguish itself from other location beacons, and a location beacon technology application developer needs to be able to access this identifier in order to perform location based services. However, some operating system platforms allow easier access to an identifier than others, for example having a different file path for the identifier or a different encryption mechanism for the identifier. As a result, location beacon manufacturers typically design their location beacons to be compatible with only one type of operating system platform, potentially limiting the technology's usefulness. Therefore, it is desirable to provide a wireless beacon system and method that is applicable to multiple operating system platforms.

Hence, there is a need for a new and unique approach to determine the chances of a student dropping out of an educational institution. There is a further need for a wireless beacon system and Wi-Fi method that is resource-effective and cost-effective in the delivery of Internet content relating to objects or locations utilizing location beacon or Wi-Fi technology. There is a further need for a single system and method that can provide individual mobile communications or smart phone applications with location based services for multiple locations, stores, chains or other information providers utilizing location beacon technology. There is further a need for a wireless beacon system and method that is applicable for use on multiple operating system platforms. The present invention meets these and other needs.

SUMMARY OF THE INVENTION

Briefly, and in general terms, the present invention provides for a wireless beacon system and Wi-Fi capture method for determining the chances that a user or student drops out of an educational institution, and for delivering Internet content to a mobile communications device of a user.

The present invention provides for a wireless system that looks at a user's behavior on campus, and their engagement with the campus community, for example, whether they attend classes, events and lectures, whether they are on-campus weekends, or whether they are in the library daily. The higher the student's engagement in campus life, the greater the chances of success and therefore retention. The present invention then reduces this behavior to a single number, the student's Engagement Quotient (EQ).

The system uses two different technologies to accomplish this goal, namely an educational institution's Wi-Fi infrastructure or network, and Bluetooth Low Energy wireless beacon transmitters. The wireless capture device tracks users or students through their mobile communications devices as they attend classes and participate in student life on campus. The wireless system monitors students as they connect to the various Wi-Fi stations throughout campus and uses this information to calculate the level of participation in campus life, namely the engagement quotient value. The wireless beacon transmitters are used to take attendance and provide location based information to students.

In the providing of such location based information, the present invention further provides for a system and method that allows information providers, including educational institutions, retailers, museums, restaurants, and the like, to use location beacons to link one or more objects, locations, persons, or pets to Internet content, such as a video, a picture, a map, a website or a web application, and to deliver information such as web links directing to this Internet content to a user's mobile communications device. The use of web links allows the wireless beacon system and method to facilitate interaction between information providers and users by providing a resource and cost-effective, individual application that enables users to receive Internet content from any information provider on multiple platforms without needing to download and install location beacon technology applications for each separate information provider.

Accordingly, the present invention provides for a wireless beacon system that includes a wireless beacon transmitter configured to transmit a wireless data signal including a unique identifier of the wireless beacon transmitter, a mobile communications device having a unique identifier that is configured to receive the wireless data signal, and a server communicatively coupled with the mobile communications device having at least one database configured to store a plurality of unique identifiers associated with a plurality of corresponding information such as web links directing to Internet content. The mobile communications device is configured to compare a received signal strength of the wireless data signal with a predetermined threshold received signal strength, to establish a connection with the server if the received signal strength of the wireless data signal is greater than or equal to the predetermined threshold received signal strength, and to transmit linking data including the unique identifier of the wireless beacon transmitter, the unique identifier of the mobile communications device, and contact information for the mobile communications device to the server over the connection. The server is configured to query information corresponding to the unique identifier of the wireless beacon transmitter such as a web link from the database when the unique identifier is received by the server, and the mobile communications device is configured to receive the information when it is returned from the server.

In one presently preferred aspect, the unique identifier of the wireless beacon transmitter is the network address of the wireless beacon transmitter, and the unique identifier of the mobile communications device is the network address of the mobile communications device. In another presently preferred aspect, the wireless beacon transmitter is configured to transmit the wireless data signal periodically at least once every ten seconds. In another presently preferred aspect, the wireless data signal is a low power radio frequency signal. In another presently preferred aspect, the mobile communications device is further configured to determine a distance between the mobile communications device and the wireless beacon transmitter based upon the received signal strength of the wireless data signal and the predetermined threshold received signal strength.

In another presently preferred aspect, the connection between the mobile communications device and the server is a Wi-Fi internet connection or a cellular internet connection. In another presently preferred aspect, the linking data and the information such as the web link are AES encrypted over the connection. In another presently preferred aspect, the mobile communications device is a smartphone, and the contact information for the mobile communications device includes a phone number of the smartphone and a language of choice of the user.

In a further presently preferred aspect, the wireless beacon transmitter is associated with an object, and the Internet content relates to the object. In another presently preferred aspect, the wireless beacon transmitter is associated with a user by placing the wireless beacon transmitter on a wearable item of the user. In another presently preferred aspect, the web link directing to Internet content can be a video, a picture, a map, a web page, an application, and combinations thereof. In another presently preferred aspect, the mobile communications device is configured to display the Internet content on a web browser accessed from the mobile communications device.

According to a presently preferred aspect, there is provided a method for determining the chances that a student drops out of an educational institution, including associating a Wi-Fi connection with a value to establish a student's engagement to campus life. This information is converted to a single number to quantify the level of engagement.

According to another presently preferred aspect, the method further includes determining a distance between the mobile communications device and the wireless beacon transmitter based upon the received signal strength of the wireless data signal and the predetermined threshold received signal strength. According to another presently preferred aspect, the method further includes querying the database to determine whether an information provider requests the contact information for the mobile communications device, and appending the contact information as parameters to the web link if the database indicates that the information provider requests the contact information. According to another presently preferred aspect, the method further includes displaying the Internet content on a web browser accessed from the mobile communications device. According to another presently preferred aspect, the method further includes associating the wireless beacon transmitter with a user by placing the wireless beacon transmitter on a wearable item of the user. According to another presently preferred aspect, the wearable item is a jewelry accessory.

These and other aspects and advantages of the invention will become apparent from the following detailed description and the accompanying drawings, which illustrate by way of example the features of the invention.

DETAILED DESCRIPTION OF THE PREFERRED EMBODIMENTS

Referring to the drawings, which are provided for purposes of illustration and by way of example, the present invention provides for a system and method for determining the chances that a user drops out of an educational institution, and for delivering Internet or Intranet content to a mobile communications device of a user, for example a smartphone, laptop or tablet. In one presently preferred aspect, the wireless capture system is used to develop a single value, namely an engagement quotient (EQ), that represents a student's engagement to an educational institution campus community. Specifically in this aspect, the wireless beacon system uses students' smartphones to track their movement on campus and their class attendance. All relevant information such as student, device, class and information such as Internet or Intranet link data is entered into a central database. Various actions are triggered as the student's phone moves around campus.

According to a preferred aspect, the present invention provides a way to study student behavior, habits and movement in an effort to improve student retention and provide methods for passively tracking a student's location. It provides several devices, methodologies and processes to provide an institution with detailed data about a student's actions and movements. This data can be used to promote a retention plan or as general access control information. It also initiates an intervention strategy that involves email and texts to students as well as email to parents under certain circumstances.

The wireless capture system gathers information about a student's habits and assigns a value to each aspect of that behavior. The wireless capture system gathers this information and calculates students' engagement with campus life. The wireless capture system creates a single number to represent this "Engagement Quotient" (EQ), and uses it to determine who is in need of support services implementing the retention policy of the educational institution.

According to a preferred aspect, the wireless capture system uses two established technologies, wireless networking, Wi-Fi, and Bluetooth Low Energy, BLE, to accomplish this task. The wireless capture system uses these technologies and their interaction with smartphones to accomplish an institution's retention policies and goals.

According to a presently preferred aspect, as a student enters a Wi-Fi zone, the wireless capture system senses a mobile communications device and reports the information to a remote server for processing at a later date. The Wi-Fi zone or local access point is associated with a numerical point value. In this aspect, the wireless capture system requires no application on the phone or action required by the smartphone user. The numerical point value can have various values by time of day and day of the week. The numerical point values are reviewed by the wireless capture system weekly and their values are added to the student's Engagement Quotient. The engagement quotient can have a positive value, representing a positive engagement or that a student is willing to remain in the educational institution, or a negative value, representing a negative engagement or that a student is in danger of dropping out of the educational institution. If a students' EQ falls below a threshold set by the institution, emails and texts, developed by the institution, are automatically sent to the student to support the educational institution's intervention strategy. If the institution has attained a FERPA waiver from the student, email can also be sent to the student's parent.

For example, the wireless capture system periodically polls all the possible devices on the Wi-Fi network using the Address Resolution Protocol (Request for Proposal RFC 826, and Internet Standard STD 37) by sending a wireless data signal to each device. It then relays the addresses of the devices that responded to the polls in the form of linking data to a server which converts the local access point into a numerical point value that adjusts the student's current Engagement Quotient value. According to an aspect, this numerical point value, set by the institution, is variable by time of day and day of week. According to an aspect, this information is gathered by passively monitoring a Wi-Fi connection without a specialized application on the phone or any active participation by the student. Implementing this procedure allows the passive collection of student behavior data.

According to another presently preferred aspect, a wireless attendance system is provided which requires an application on the phone that must be run one time, and uses a wireless beacon transmitter using Bluetooth Low Energy (BLE) technology. In one aspect, the wireless beacon system allows a smartphone to uniquely identify a wireless beacon transmitter without actually connecting to the wireless beacon transmitter. In another aspect, the wireless beacon transmitter advertises information to any smartphone in the area, including the media access controller (MAC) address. In another aspect, this information is AES encrypted in the advertisement and can only be decrypted by the wireless beacon application stored in the mobile communications device.

For example, the wireless beacon transmitter for attendance is controlled by an information provider who owns or manages the wireless beacon transmitter, for example an educational institution, through the instructor. In an exemplary aspect, an instructor presses a button on the wireless beacon transmitter in a classroom and begins a class attendance process. The wireless beacon transmitter begins advertising a custom message or wireless data signal to the smartphones proximate to the wireless beacon transmitter, such as those of students in a classroom. The students' smartphones receive the message and contact a server over the educational institution's network to verify that the student is enrolled in the current class associated with the instructor's wireless beacon transmitter. Information in the form of a notification is sent back to the phone acknowledging attendance. If setup by the instructor, information in the form of an additional notification can be sent to the student pointing to additional content that resides somewhere on the Internet. This can be any content, including a web page, a YouTube video or information that resides on the campus computer infrastructure. Attending a class has a numerical point value that increments or decrements the student's Engagement Quotient which is used to ascertain the student's participation in campus life and affect their retention.

According to another presently preferred aspect of the invention, a wireless beacon transmitter is strategically placed at various locations throughout campus. As a student approaches a wireless beacon transmitter, the wireless beacon transmitter sends a wireless data signal including the wireless beacon transmitter's unique identifier to the student's phone. The phone senses the wireless beacon transmitter, receives the wireless data signal, and transmits the wireless beacon transmitter's unique identification to a server. The server returns information in the form of a notification to the student offering additional content relating to the location. Once again, this can be any information located on the Internet or the institution's Intranet. As an example, during orientation, as a student approaches a building that contains a wireless beacon transmitter, information in the form of content is pushed to the phone regarding that location. This could be a campus map showing the current location, a floor plan of the building, or a video of someone giving the history or tour of the facility. Each contact with a wireless beacon transmitter has an engagement value that increments or decrements the student's Engagement Quotient which is used to ascertain the student's participation in campus life and affect their retention.

In another presently preferred aspect, the present invention provides for a system and method of forming a bridge using wireless beacon transmitters or location beacons that link one or more physical objects, locations, or persons to information content that is stored on the Internet, such as a video, a picture, a map, a website or a web application. In one presently preferred aspect, the present invention provides for an application which capitalizes on the combined power of mobile communications devices, the Internet, and wireless beacon transmitters using Bluetooth Low Energy (BLE) technology to link any object, location, or person to information available on the Internet by delivering web links directing to this Internet content to the user's mobile communications device. The present invention automatically delivers web links directing to the Internet content to users when they are within a predetermined range of the wireless beacon transmitter, thereby allowing the user to access the web link on the user's mobile communications device. The system and method provides the web links to users with minimal user effort, simply giving users the choice whether to view Internet content on the user's mobile communication device by activating the delivered web link.

Persons and entities including educational institutions, businesses, non-profit organizations, governmental agencies, or other information providers who desire to deliver Internet content to users register a wireless beacon transmitter that is associated with an object, such as a house or retail good, or a location, such as a restaurant or store, into a server database. Alternatively, users who desire to deliver Internet content to other users can register a wireless beacon transmitter that they associate with themselves, as persons, through a wearable item, such as an article of clothing or an accessory like casual jewelry. These registered information providers and users then provide into the server database a web link, such as a web address, URL, or application name, that is directed to the Internet content, for example, a web address directed to a video, a URL directed to a web page, or an application name directed to an app. Once the web link is provided, a mobile communications device that comes within a predetermined range of a wireless beacon transmitter communicates with the server and receives a notification of the web link, which the user can activate to receive the Internet content, such as a video giving a tour of a listed home, a coupon for a retail good, an application for a coffee shop, or a social media page of another user, for example.

In a presently preferred aspect, web links are protected and communications or transactions between the mobile communications device and the server are typically AES encrypted. In another presently preferred aspect, the system and method appends contact information, such as a user's phone number and language of choice, as parameters to the web link so that when the user activates the web link, the contact information is transmitted to the information provider. With the user's contact information, the wireless beacon system allows information providers to create a dynamic and individual user experience through the Internet content. In another presently preferred aspect, the system and method prevents modifications or edits by users of the web link.

The wireless beacon system and method is particularly advantageous for applications in densely populated areas or communities. Since the present invention delivers to a user's mobile communications device web links directed to Internet content, as opposed to the actual Internet content itself, relatively less data is transferred from the server to the mobile communications devices that are within range of one or more wireless beacon transmitters, thus potentially saving bandwidth usage and cost. Moreover, the wireless beacon system and method facilitates interaction between multiple information providers and users by providing a single, individual application compatible with multiple operating system platforms that enables users to receive advertisements, coupons, videos, pictures, maps, restaurant menus, websites, applications and any other conceivable Internet content from any information provider without needing to download and install location beacon technology applications for each separate information provider.

Figure 1:
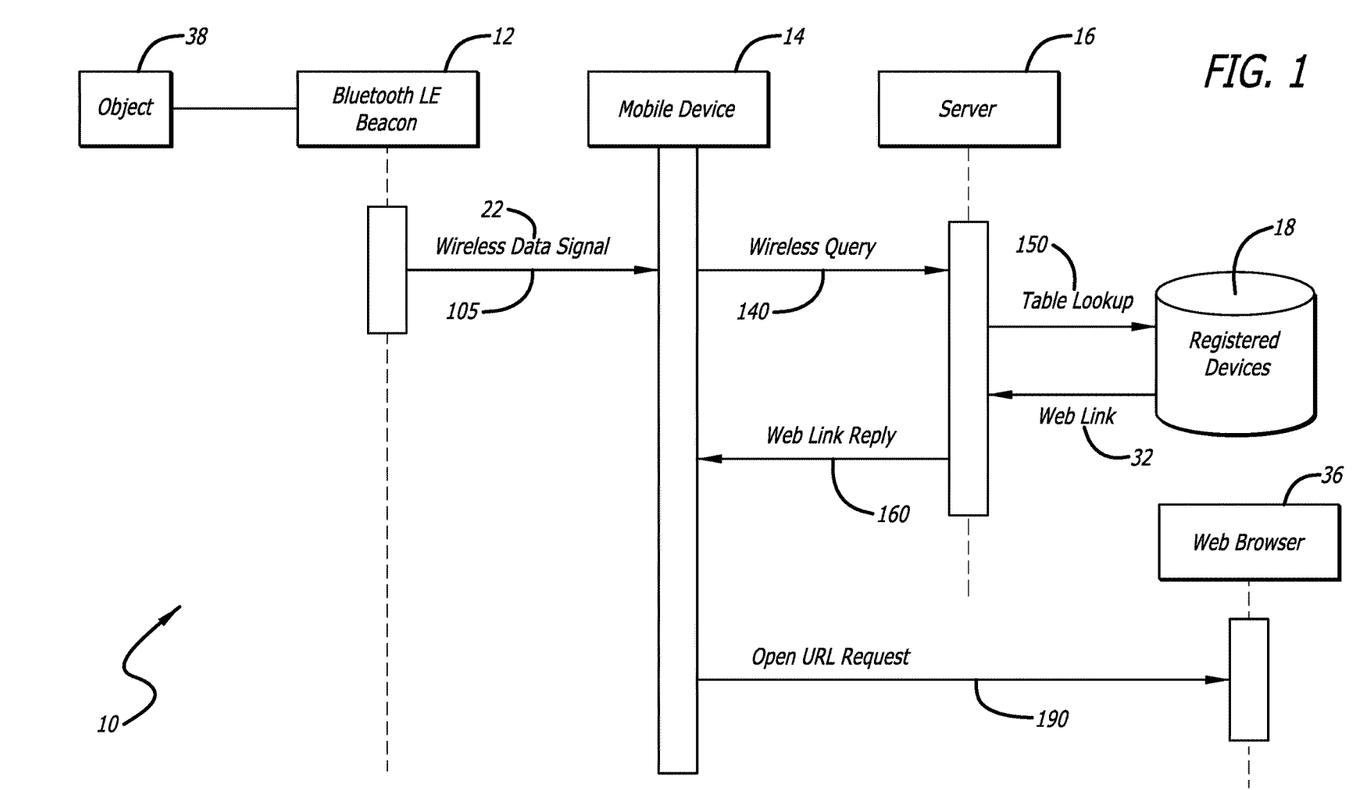
FIG. 1 is a schematic diagram illustrating a system and method for delivering content to a user's mobile communications device which is used in determining the chances that a user drops out of an educational institution according to the invention.
Figure 2:
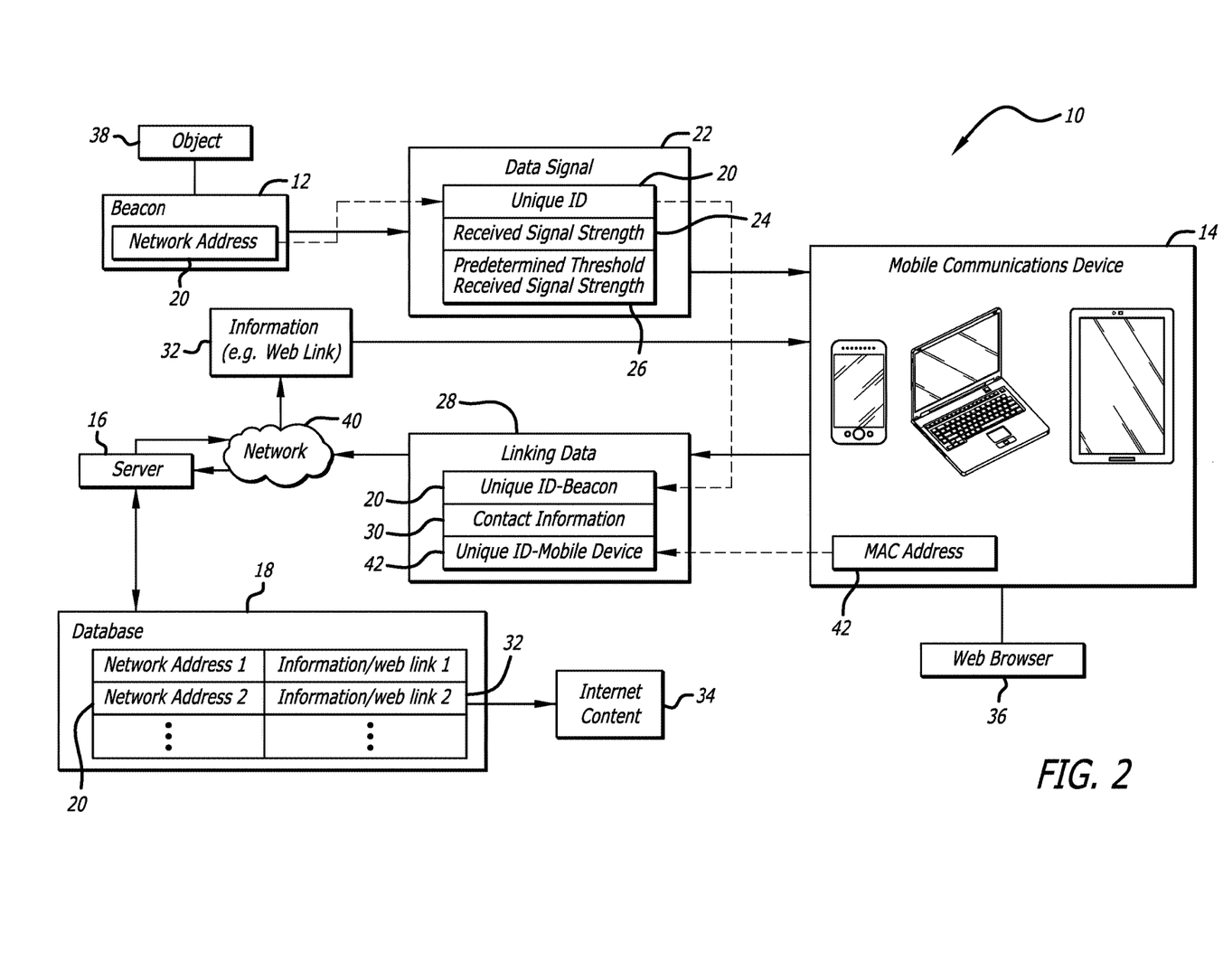
FIG. 2 is a schematic diagram illustrating the system and method for delivering content to a user's mobile communications device which is used in determining the chances that a user drops out of an educational institution as depicted in FIG. 1, further illustrating the structure of components in the system.
Figure 3:
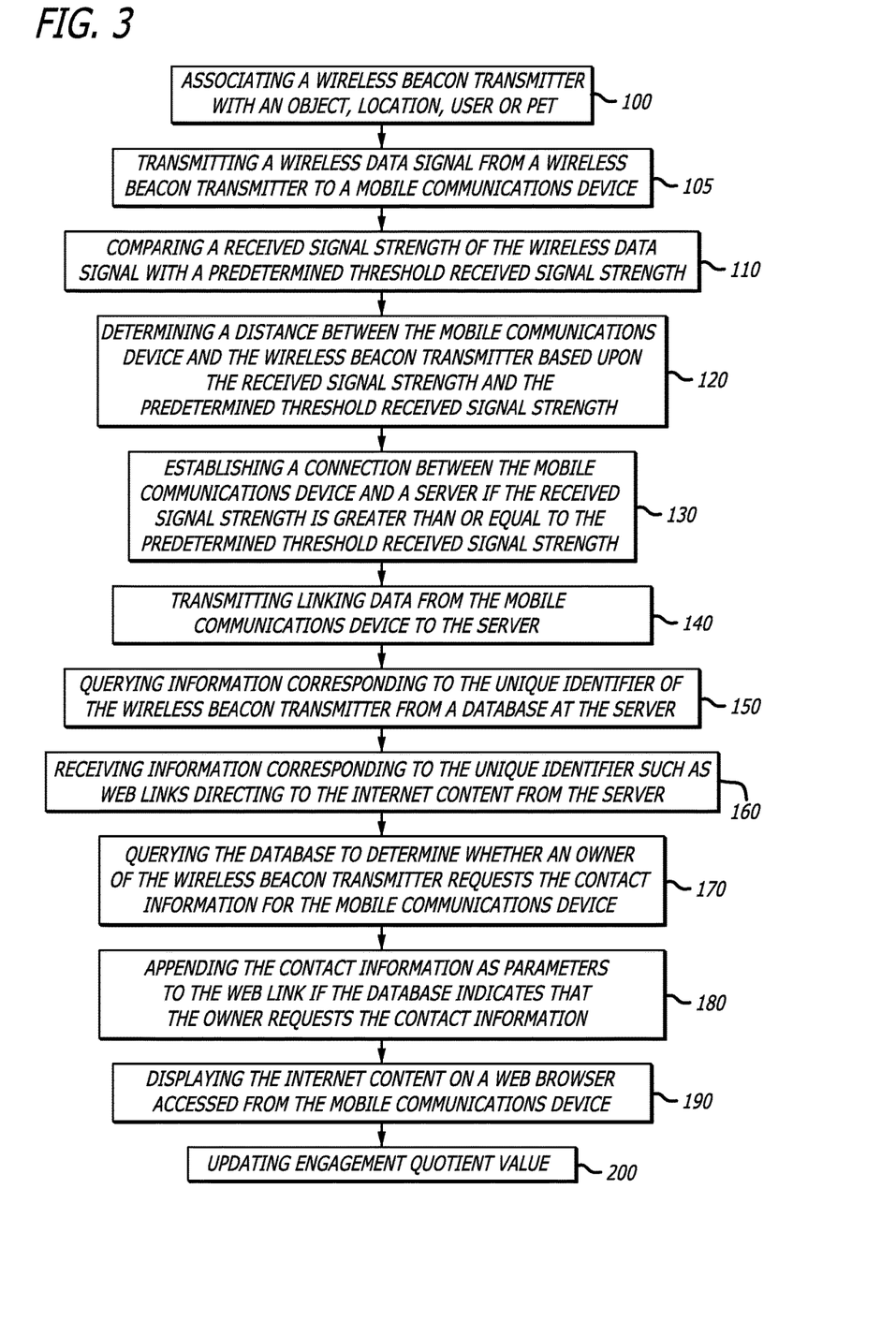
FIG. 3 is a flowchart showing a presently preferred aspect of a method for delivering content to a user's mobile communications device which is used in determining the chances that a user drops out of an educational institution as depicted in FIG. 1, further illustrating the structure of components in the system.

Details of the wireless beacon system and method are further described in reference to the drawings. As is illustrated in FIGS. 1, 2 and 3, the wireless beacon system 10 includes a wireless beacon transmitter 12, a mobile communications device 14 in communication with the wireless beacon transmitter, and a server 16 communicatively coupled with the mobile communications device which includes at least one database 18. The database can be internal to the server, or be a separate, external component connected to the server. In an exemplary aspect, more than one database exists. The mobile communications device is communicatively coupled to the server via a network 40, for example, an intranet Wi-Fi infrastructure for an educational institution.

According to a presently preferred aspect, the wireless beacon transmitter has a unique identifier 20 which identifies the wireless beacon transmitter. The wireless beacon transmitter is configured to transmit radio frequency signals, including a wireless data signal 22, which may include an advertising packet, for example, within a predetermined range (105). This predetermined range, in some aspects, is a range typically designed by the beacon's manufacturer. According to a presently preferred aspect, the unique identifier 20 which identifies the wireless beacon transmitter is the network address of the wireless beacon transmitter, for example its Internet Protocol (IP) address or its Media Access Control (MAC) address. In another aspect, the wireless beacon transmitter transmits low power radio frequency signals using Bluetooth Low Energy (BLE) technology. In another aspect, the wireless beacon transmitter transmits the wireless data signal on a periodic basis, for example once every ten seconds.

The mobile communications device is configured to receive the wireless data signal 22 from the wireless beacon transmitter (105). The wireless data signal 22 includes a received signal strength indicator (RSSI) or received signal strength 24, and a predetermined transmitter power reference value (txPower) or predetermined threshold received signal strength 26. The received signal strength of the wireless beacon transmitter is the strength of the signal level when it is received into the mobile communications device. The predetermined threshold received signal strength is a reference value that indicates how strong the signal level should be at a known distance, for example, one meter.

The mobile communications device also has a unique identifier 42. According to a presently preferred aspect, the unique identifier 42 which identifies the mobile communications device is the network address of the mobile communications device, for example its Internet Protocol (IP) address or its Media Access Control (MAC) address. The mobile communications device is configured to compare the received signal strength 24 with the predetermined threshold received signal strength 26 to determine whether the received signal strength is greater than or equal to the predetermined threshold received signal strength (110). Optionally, the mobile communications device is further configured to determine a distance between the mobile communications device and the wireless beacon transmitter based upon the received signal strength of the wireless data signal and the predetermined threshold received signal strength (120). If the received signal strength is greater than or equal to the predetermined threshold received signal strength, then the mobile communications device is considered sufficiently proximate to the wireless beacon transmitter to receive information such as Internet content and is configured to establish a connection with the server (130). According to some exemplary aspects, the connection between the mobile communications device and the server can be a Wi-Fi internet connection or a cellular connection. According to a presently preferred aspect, any data communicated between the mobile communications device and the server over the connection is AES encrypted.

The mobile communications device is further configured to transmit a wireless query or linking data 28 to the server over the established connection (140). Preferably, the linking data includes the unique identifier 20 of the wireless beacon transmitter, the unique identifier 42 of the mobile communications device, and contact information 30 for the mobile communications device. In an exemplary aspect where the mobile communications device is a smartphone, contact information includes the phone number of the smartphone. In another exemplary aspect for any type of mobile communications device, for example smartphones, laptops, and tablets, contact information includes the user's language of choice.

When the server receives the linking data including the unique identifier, the server is configured to query information 32 from the database using the unique identifier (150). In an exemplary aspect, information 32 is a web link directing to Internet content 34. The web link directs or relates to any Internet content 34, for example a video, picture, map, web page, application, or combinations thereof. In another exemplary aspect, information 32 is in the form of a notification acknowledging classroom attendance, additional content from an educational institution's Intranet or Internet content recommended to a student by an instructor, web links directing to Internet or Intranet content on campus or in any other location, or the like. In a preferred exemplary aspect, information 32 includes an engagement quotient for each student, and numerical point values associated with different locations used to update the engagement quotient. According to a presently preferred aspect, the database stores a plurality of unique identifiers for each wireless beacon transmitter that is registered in the wireless beacon system, and a plurality of corresponding information 32, such as web links directed to Internet content provided by information providers or users that are associated with each unique identifier. If the wireless beacon transmitter is registered in the database, then the server retrieves the web link corresponding to the unique identifier.

Afterwards, the mobile communications device receives the information such as a web link corresponding to the unique identifier from the server (160). The mobile communications device then processes the information for the user. In an exemplary aspect related to web links, the mobile communications device automatically notifies the user of the web link, allows the user to choose whether to activate or dismiss the web link, and, if activated, sends an open URL request to a web browser 36 to display the Internet content, for example a video, picture, map, web page, advertisement, coupon, restaurant menu, application, or any other conceivable content (190). In another exemplary aspect, the wireless beacon transmitter is associated with an object 38 such as a house or retail good, or a location such as a classroom, campus facility, restaurant, or store, and the wireless beacon system returns Internet content related to the object or location to be displayed on the mobile communications device such as a campus map showing the user's current location, a floor plan of a building, a video giving a history or tour of a facility or a listed home, a coupon for a retail good, or a software application for a coffee shop (100). Additionally, the wireless beacon transmitter can be associated with another user through a wearable item such as an article of clothing or an accessory like casual jewelry, and the wireless beacon system returns Internet content related to the other user to be displayed on the mobile communications device such as a social media page of the other user (100). In some aspects, the wireless beacon transmitter can be associated with a pet through a wearable item such as a dog collar, and the wireless beacon system returns Internet content related to the pet to be displayed on the mobile communications device such as a web page of the pet (100).

According to a presently preferred aspect of the invention, the database further includes an indication identifying whether an information provider that owns or manages a wireless beacon transmitter wishes to know the mobile device contact information, such as the user's language of choice (170). The server is configured to query the database to determine whether the information provider desires to know the contact information, and if so, the server appends the contact information as parameters to the web link prior to sending it to the mobile communications device (180). In a presently preferred aspect, the server appends the parameters to the web link in HTML GET request format. As a result, when the user activates the web link on the mobile communications device, the contact information is transmitted to the information provider, allowing the information provider to return personalized content to the user.

FIG. 3 illustrates a presently preferred aspect of a method for determining the chances of a student dropping out of an educational institution according to the present invention. According to a presently preferred aspect, the method includes associating a wireless beacon transmitter with an object, location, user or pet (100), transmitting a wireless data signal, such as an advertising packet, from a wireless beacon transmitter to a mobile communications device (105), comparing a received signal strength of the wireless data signal with a predetermined threshold received signal strength (110), determining a distance between the mobile communications device and the wireless beacon transmitter or object based upon the received signal strength and the predetermined threshold received signal strength (120), establishing a connection between the mobile communications device and a server if the received signal strength is greater than or equal to the predetermined threshold received signal strength (130), transmitting linking data from the mobile communications device to the server (140), querying information corresponding to the unique identifier of the wireless beacon transmitter from a database at the server (150), receiving the information corresponding to the unique identifier from the server (160), querying the database to determine whether an information provider who owns or manages the wireless beacon transmitter requests the contact information for the mobile communications device (170), appending the contact information as parameters to the web link if the database indicates that the information provider who owns or manages the wireless beacon transmitter requests the contact information (180), displaying the Internet content on a web browser accessed from the mobile communications device (190), and recording an updated engagement quotient value (200).

Referring to step 100, according to a presently preferred aspect, an information provider or user associates a wireless beacon transmitter 12 with an object 38, location, user or pet by placement and registration. In an exemplary aspect, an information provider places the wireless beacon transmitter on an object, such as a retail good, vehicle, or house, or at a location, such as a classroom, hall, facility or other educational institution location, or at a grocery store, museum, or amusement park. In a further aspect, a user who desires to be associated with the wireless beacon transmitter places the wireless beacon transmitter on a wearable item that the user carries, such as an article of clothing or an accessory like casual jewelry. Alternatively, a user who desires to associate a wireless beacon transmitter with a pet can place the wireless beacon transmitter on a wearable item that the pet carries, for example a dog collar.

After the information provider or user places the wireless beacon transmitter 12 with an object, location, user, or pet, the information provider or user registers the wireless beacon transmitter into a database 18 on a server 16. For example, the information provider or user saves into the database a unique identifier 20 of the wireless beacon transmitter, such as its network address, a unique identifier 42 of the mobile communications device, and information 32 such as a web link directed to Internet content 34 related to the object, location, user, or pet. For example, the web link can direct the user to a video giving a tour of a listed home, a coupon for a retail good, a software application for a coffee shop, or a social media page of another user. In an exemplary aspect, information 32 can include contact information about the user or student, class schedules, rosters, notifications acknowledging classroom attendance, additional content from an instructor, the engagement quotient of the user or student, numerical point values associated with different wireless beacon transmitters used to update the engagement quotient of a user or student, or any other conceivable form of delivered content. After the wireless beacon transmitter and information are registered into the database, the association process is complete, and the remaining steps denoted in FIG. 3 are applied with respect to FIGS. 4-6 below.

Figure 4:
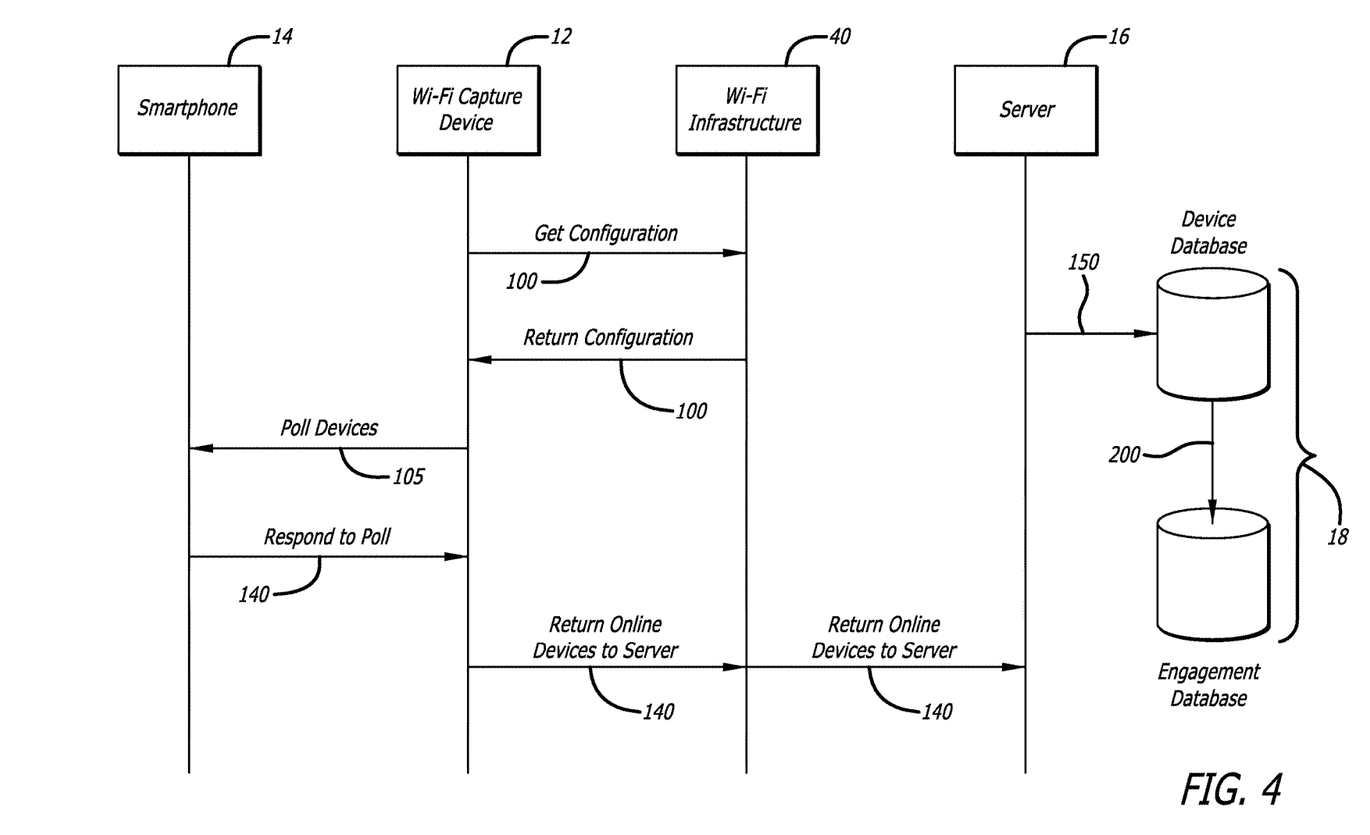
FIG. 4 is a schematic diagram illustrating a presently preferred aspect of a system and method for determining the chances that a user drops out of an educational institution according to the invention showing the components and process to calculate a value that represents the level of engagement students have with the college community.
Figure 5:
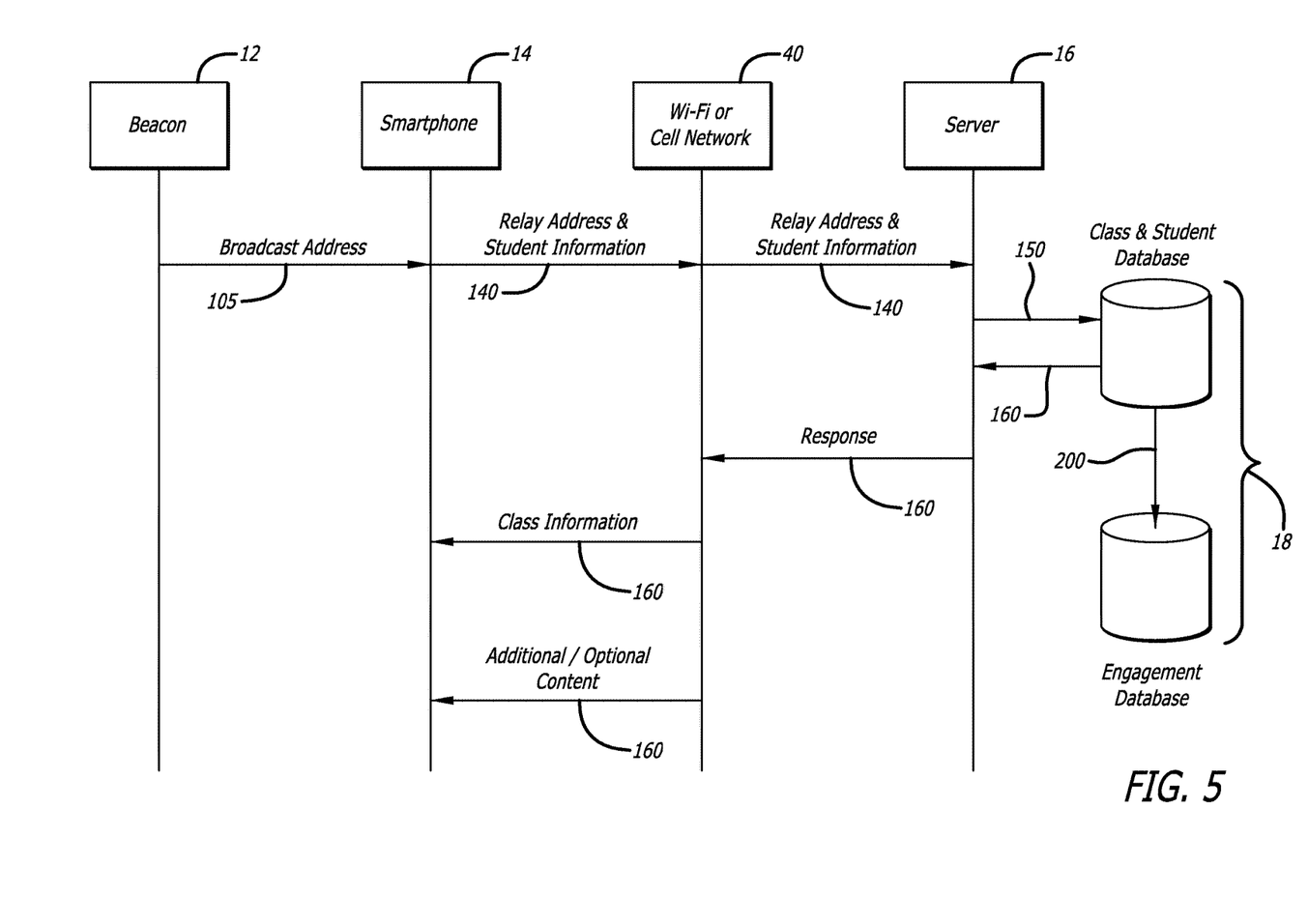
FIG. 5 is a schematic diagram illustrating another presently preferred aspect of a system and method for determining the chances that a user drops out of an educational institution according to the invention showing the components and process used to calculate a value that represents the level of engagement students have with the college community.
Figure 6:
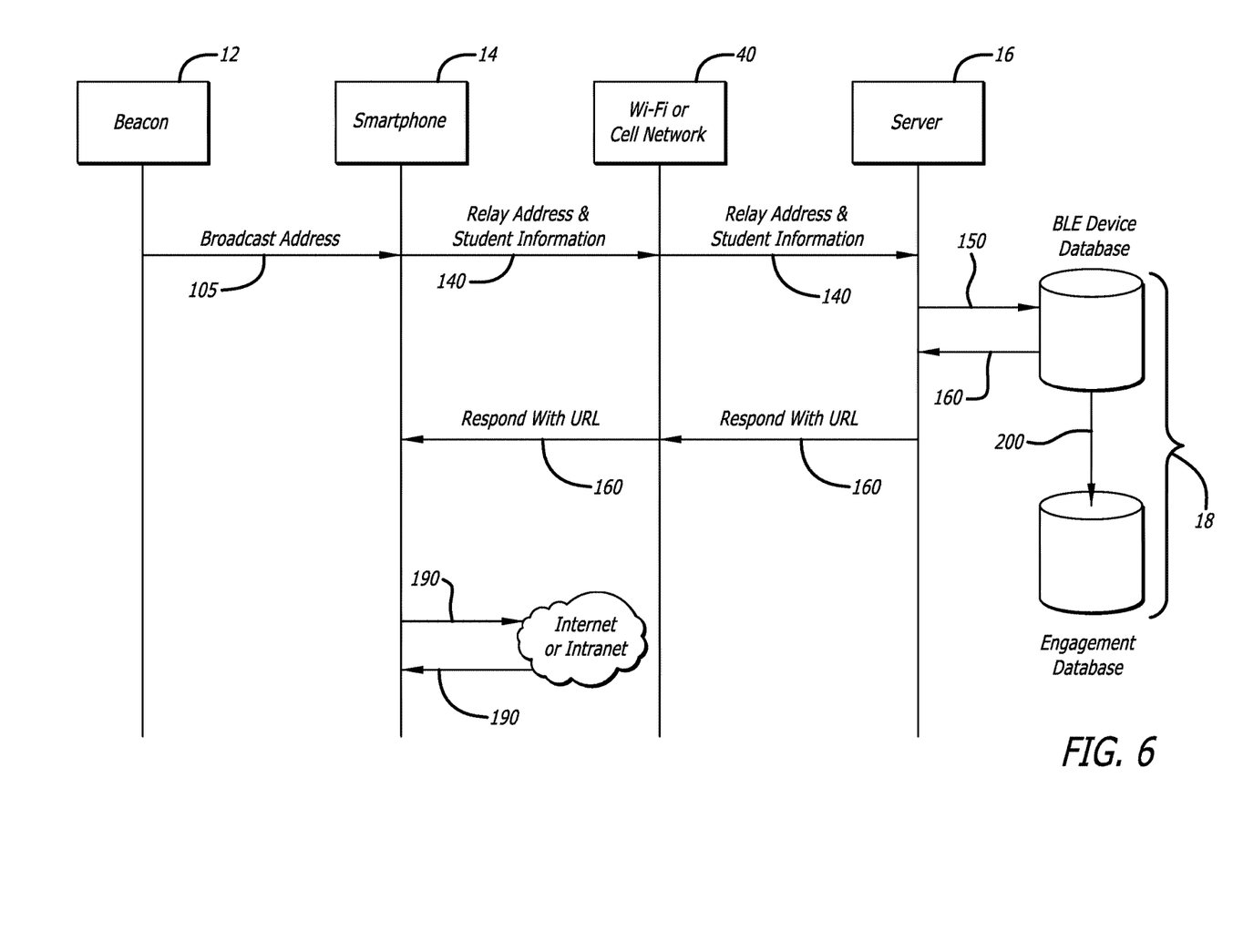
FIG. 6 is a schematic diagram illustrating a further presently preferred aspect of a system and method for determining the chances that a user drops out of an educational institution according to the invention showing the components and process used to calculate a value that represents the level of engagement students have with the college community.

FIGS. 4-6 illustrate the wireless capture system and method as used to calculate a value that represents the level of engagement students have with the college community. This value, namely the engagement quotient, is used to isolate students who are at risk of dropping out of college. An educational institution can use this list to target resources in an effort to increase student retention.

According to a presently preferred aspect, three processes are used to develop a single value that represents a student's engagement to the campus community. All three processes use a student's smartphone to track their movement on campus and their class attendance. The wireless capture system covers the process of collecting the data as well as the final engagement quotient value as specifically used in an educational environment. All relevant information such as student, device, class and Internet or Intranet link data is entered into a central database. Various actions are triggered as the student's phone moves around campus.

Referring to FIG. 4, according to a presently preferred aspect, the wireless capture device monitors a Wi-Fi access point. Periodically, the system polls the connected devices to ascertain who is on the network 40. This information is relayed to a central computer or server 16. The invention looks up the Wi-Fi access point in the database 18 and retrieves a numerical point value for the access point. This value can vary by time of day and day of the week. The wireless beacon system then adds or subtracts this value from the student's Engagement Quotient (EQ). Specifically:

(1) The wireless capture device 12 connects to a local Wi-Fi access point on a Wi-Fi infrastructure or network 40 and retrieves configuration data (100).

(2) The Wi-Fi infrastructure or network 40 returns the IP address range of the local Wi-Fi access point to the wireless beacon transmitter (100).

(3) The wireless capture device then connects to the Wi-Fi network and uses the Address Resolution Protocol (Request for Proposal RFC 826, and Internet Standard STD 37) to poll the devices 14 connected to the network 40 (105).

(4) If a smartphone or other Wi-Fi device 14 is using the polled address, it returns the Wi-Fi Media Access Controller (MAC) address to the wireless beacon transmitter (140).

(5) When the polling is complete, the wireless capture device connects to the Wi-Fi infrastructure or network 40 and begins transmitting the list of found mobile communications devices to the server 16 (140). The wireless capture device then goes to sleep for ten minutes and begins the process again at the beginning (namely step 100).

(6) The Wi-Fi infrastructure or network 40 forwards the device list to the server (140).

(7) The server looks up the local Wi-Fi access point in the device database 18 and retrieves the current numerical point value for the access point at this time of day and day of the week (150).

(8) This information is then passed to the student engagement database (200). The student's Engagement Quotient is retrieved by the MAC address representing the student's smartphone (200). If the student is found in the database 18, the numerical point value retrieved is added or subtracted from the student's Engagement Quotient (200).

Referring to FIG. 5, according to a presently preferred aspect, the wireless beacon system allows an instructor to take attendance by registering all the smartphones 14 in the room with the simple press of a button. The instructor uses a wireless beacon transmitter 12, such as key fob like device, that sends a BLE signal to the entire room. The BLE enabled smartphones receive the signal, contact a server 16 to verify their enrollment in the class and mark them as attending or present. The server also adjusts the students Engagement Quotient as specified. Specifically:

(1) To take attendance the instructor presses a button on the wireless beacon transmitter 12 that sends a wireless data signal (i.e. broadcasts its address) to the BLE enabled phones 14 in the area (105). The wireless data signal includes the encrypted MAC address of the wireless beacon transmitter.

(2) The phone decrypts the information in the wireless data signal provided by the wireless beacon transmitter to retrieve the MAC address of the wireless beacon transmitter (140). It then sends the address as well as the MAC address of the phone along with student specific information to the Wi-Fi or cellular network 40 to be forwarded to the server 16 for processing (140).

(3) The Wi-Fi or cellular network 40 forwards the information to the server for processing (140).

(4) The server 16 looks up the wireless beacon transmitter, the student information, the class schedule and roster in the database 18 (150).

(5) If the server 16 determines that the student should be in this class at this time, it returns a notification to the student acknowledging his or her attendance and records the information in the database (160). If the instructor has provided additional content to be pushed to the student it is included in the response (160).

(6) The engagement value of attendance for this class is then recorded in the student record for processing at a later date (200).

(7) The response to the attendance transaction begins its return journey to the phone by passing the response to the network (160).

(8) The network sends the response to the phone (160). A notification is posted to the phone acknowledging successful attendance (160).

(9) If additional content has been provided by the instructor, a second notification is posted to the phone (160).

Referring to FIG. 6, according to a presently preferred aspect, the wireless beacon system associates information on the Internet or Intranet to a location. The location is determined by the placement of a Bluetooth Low Energy device 12. Any contact with the device 12 is assigned a value that is used as part of the retention calculation. As an example, if the BLE device or wireless beacon transmitter 12 is placed at a campus event and a student's phone 14 catches the device's advertising signal, a link to the event's program can be pushed to the phone and a value added to the students Engagement Quotient for participating in the event. Specifically:

(1) A Bluetooth Low Energy device 12 transmits a wireless data signal (i.e. broadcasts its address) to any BLE equipped smartphone 14 in the area (105).

(2) The smartphone recognizes the BLE device 12 and relays the device's MAC address, the phone's MAC address, and other student specific information through the Wi-Fi or cellular network 40 to the server 16 (140).

(3) The Wi-Fi or cellular network 40 passes the information from the phone to the server 16 for processing (140).

(4) The server 16 retrieves information about the originating device 12 (150).

(5) The URL associated with the originating device 12 begins its return voyage to the phone 14 (160).

(6) The server 16 updates the students Engagement Quotient to reflect the contact with the originating device 12 (200).

(7) The server places the URL on the network 40 for its ultimate return to the phone (160). The network returns the URL to the phone (160).

(8) The information shows up on the phone as a notification (160).

(9) Should the student activate the link, the phone's browser is activated and the URL request is placed on the network (190).

(10) The content of the URL is returned to the phone for display by the browser (190).

Hereinafter described are various exemplary, alternate or additional uses of the invention:

Grocery Stores: A grocer places a single wireless beacon transmitter at the entrance to his or her grocery store. When a user carrying a mobile communications device enters the grocery store, the wireless beacon system allows the grocer to notify smart phone users upon entry of items on sale. These items could change virtually every day, thereby allowing the grocer a targeted approach to 'couponing'. In addition, internal loyalty programs can provide greater value to both the information provider and consumer through a highly tailored coupon and information program.

Retail (electronics, appliances): A retail store owner places a single wireless beacon transmitter on an item in his or her retail store. When a consumer carrying a mobile communications device enters the retail store, the wireless beacon system allows the consumer to immediately receive unlimited information on the product without having to search for a salesperson. This information could include a greeting from management along with a video of the product in use. Moreover, a manufacturer who places a wireless beacon transmitter on a product would be able to provide helpful setup and use information after the product is purchased, thereby creating a more positive relationship with the consumer, which results in greater product satisfaction and increased brand loyalty.

Automobile Industry: An automobile manufacturer places a wireless beacon transmitter into an automobile before the vehicle is shipped to a dealership. When a consumer carrying a mobile communications device approaches the automobile, the wireless beacon system allows the automobile manufacturer to directly project a message to the consumer about the vehicle.

Real Estate: A realtor places a wireless beacon transmitter at or near a house for sale. When a user carrying a mobile communications device approaches the house, the wireless beacon system allows the realtor to greet the user, provide a personal tour of the property with pictures and videos, display the listing in the user's language of choice, and display a list of similar homes for sale by the realtor in that neighborhood, all without requiring third party involvement.

Museums, Arenas, Airports, Transit Systems: An information provider places a wireless beacon transmitter at various locations throughout a museum, arena, airport, or transit system. When a user carrying a mobile communications device approaches the particular location, the wireless beacon system allows the information provider to provide, for example, museum tours, arena ticket and seat information, airport directions and flight information, or transit system directions and schedules. The placement of beacons can provide information that not only enhances the user experience but also promotes the sale of tickets and retail destinations such as food or merchandise.

Fashion and Style: A person wears a wireless beacon transmitter which is associated with an article of clothing such as a shirt, blouse, hat, or scarf, or a jewelry accessory such as a necklace, ring or bracelet. Alternatively, the person associates the wireless beacon transmitter with his or her pet, such as by attaching it to a dog collar. When a user carrying a mobile communications device approaches the person and/or pet, the wireless beacon system allows the person to provide to the user, for example, the person's social media page and/or information about the person's pet.

Educational Institution for Determining Chances Whether A Student Drops Out: An educational institution provides wireless beacon transmitters associated with various locations throughout the college or university. As a student progresses through the university, walking around campus, going to classes, sitting in the library, attending campus events, the student approaches the various wireless beacon transmitters. When the student is proximate to each wireless beacon transmitter, the wireless beacon transmitter queries and updates the student's engagement quotient for the educational institution in the database with a changing numerical point value associated with the wireless beacon transmitter. With this information, the wireless beacon system allows an educational institution to monitor a student's likelihood of remaining on campus, and if the engagement quotient falls below a predetermined threshold, the educational institution can institute its retention policy by sending out messages to the student and/or his or her parents.

The wireless beacon system and method of the present invention combine the power of smartphones and other mobile communications devices, wireless beacon transmitters or location beacons, and the Internet to provide information solutions. The system and method of the present invention have the capability to provide these solutions at a significantly lower cost than is currently available and can meet the desires of consumers and businesses with a single experience. The wireless beacon system and method of the present invention are designed to focus on the desire by businesses to strategically promote the sale of products and services; the desire by businesses to enhance the consumer experience; and the desire by consumers to obtain product or service information quickly and effortlessly.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A method for delivering Internet content associated with a wireless beacon transmitter to a mobile communications device within a predetermined range of the wireless beacon transmitter, the method comprising the steps of:

transmitting a wireless data signal from a wireless beacon transmitter having a first unique identifier to a mobile communications device of a user having a second unique identifier, the wireless data signal including the first unique identifier;

receiving linking data at a server from the mobile communications device over a network if a received signal strength of the wireless data signal received by the mobile communications device is greater than or equal to a predetermined threshold received signal strength, the linking data including the first unique identifier of the wireless beacon transmitter and the second unique identifier of the mobile communications device;

querying information corresponding to the first unique identifier including a web link directed to Internet content from at least one database in communication with the server, the at least one database including a plurality of unique identifiers of wireless beacon transmitters and a plurality of corresponding information including information regarding engagement of the user and web links directed to Internet content;

updating in the at least one database the information regarding engagement of the user using a numerical point value associated with the wireless beacon transmitter, the numerical point value being calculated into the information regarding engagement of the user to result in one of a positive value or negative value for the information regarding engagement of the user, the positive value representing that the user is willing to remain in the educational institution, and the negative value representing that the user is in danger of dropping out of the educational institution; and returning the information corresponding to the first unique identifier including the web link directed to Internet content to the mobile communications device of the user automatically in response to the received signal strength of the wireless data signal being greater than or equal to the predetermined threshold received signal strength, wherein the returned web link is prevented from modification by the user.

2. The method of claim 1, further comprising associating the wireless beacon transmitter with an object, location, user or pet of an information provider, wherein the step of associating occurs prior to the transmitting step and includes recording in the at least one database the first unique identifier of the wireless beacon transmitter and recording corresponding information including a web link directing to Internet content relating to the object, location, user or pet.

3. The method of claim 2, wherein the information corresponding to the first unique identifier is returned to the mobile communications device in a single application usable by all information providers associated with wireless beacon transmitters.

4. The method of claim 1, wherein the wireless beacon transmitter is on a wearable item of a user or pet.

5. The method of claim 1, wherein the step of returning includes returning a notification of the web link to the mobile communications device of the user that when activated by the user, sends a request to a web browser to display the Internet content.

6. The method of claim 1, wherein the linking data and the information are AES encrypted.

7. The method of claim 6, wherein transmitting the wireless data signal from the wireless beacon transmitter occurs periodically at least once every predetermined number of seconds.

8. The method of claim 6, further comprising determining a distance between the mobile communications device and the wireless beacon transmitter based upon the received signal strength of the wireless data signal and the predetermined threshold received signal strength.

9. The method of claim 6, wherein the linking data includes contact information for the mobile communications device including a phone number and a language of choice of the user.

10. The method of claim 9, further comprising:
querying the at least one database to determine whether an information provider requests the contact information for the mobile communications device; and
appending the contact information as parameters to the web link transmitted to the mobile communications device if the database indicates that the information provider requests the contact information.

11. A method for delivering Internet content associated with a wireless beacon transmitter to a mobile communications device within a predetermined range of the wireless beacon transmitter, the method comprising the steps of:
transmitting a wireless data signal from a wireless beacon transmitter having a first unique identifier to a mobile communications device of a user having a second unique identifier, the wireless data signal including the first unique identifier;

receiving linking data at a server from the mobile communications device over a network if a received signal strength of the wireless data signal received by the mobile communications device is greater than or equal to a predetermined threshold received signal strength, the linking data including the first unique identifier of the wireless beacon transmitter and the second unique identifier of the mobile communications device;

querying information corresponding to the first unique identifier including a web link directed to Internet content from at least one database in communication with the server, the at least one database including a plurality of unique identifiers of wireless beacon transmitters and a plurality of corresponding information including information regarding engagement of the user and web links directed to Internet content;

updating in the at least one database the information regarding engagement of the user using a numerical point value associated with the wireless beacon transmitter, the numerical point value being calculated into the information regarding engagement of the user to result in one of a positive value or negative value for the information regarding engagement of the user, the positive value representing that the user is willing to remain in the educational institution, and the negative value representing that the user is in danger of dropping out of the educational institution; and returning the information corresponding to the first unique identifier including the web link directed to Internet content to the mobile communications device of the user automatically in response to the received signal strength of the wireless data signal being greater than or equal to the predetermined threshold received signal strength.

12. The method of claim 11, further comprising:
connecting a wireless capture device to a local access point associated with the network;
retrieving configuration data from the local access point into the wireless capture device, the configuration data including an IP address range of the local access point;
polling a mobile communications device of a user connected to the local access point; and updating information regarding engagement of the user in the at least one database using a numerical point value associated with the local access point.

13. The method of claim 11, wherein the information transmitted to the mobile communications device includes an acknowledgement of classroom attendance of the user.

14. The method of claim 11, wherein the step of returning includes returning a notification of the web link to the mobile communications device of the user that when activated by the user, sends a request to a web browser to display the Internet content.

15. The method of claim 11, wherein the linking data includes contact information for the mobile communications device including a phone number and a language of choice of the user.

16. The method of claim 15, further comprising:
querying the at least one database to determine whether an information provider requests the contact information for the mobile communications device; and
appending the contact information as parameters to the web link transmitted to the mobile communications device if the database indicates that the information provider requests the contact information.

17. The method of claim 11, wherein the information corresponding to the first unique identifier is returned to the mobile communications device in a single application usable by all information providers associated with wireless beacon transmitters.

18. The method of claim 11, wherein the web link is prevented from modification by the user.

19. A method for delivering Internet content associated with a wireless beacon transmitter to a mobile communications device within a predetermined range of the wireless beacon transmitter, the method comprising the steps of:
associating a wireless beacon transmitter with an object, location, user or pet of an information provider, wherein the step of associating includes recording in at least one database in communication with a server a first unique identifier of the wireless beacon transmitter and recording corresponding information including a web link directing to Internet content relating to the object, location, user or pet, the at least one database including a plurality of unique identifiers of wireless beacon transmitters and a plurality of corresponding information including web links directed to Internet content;
transmitting a wireless data signal from the wireless beacon transmitter having the first unique identifier to a mobile communications device of a user having a second unique identifier, the wireless data signal including the first unique identifier;
receiving linking data at the server from the mobile communications device over a network if a received signal strength of the wireless data signal received by the mobile communications device is greater than or equal to a predetermined threshold received signal strength, the linking data including the first unique identifier of the wireless beacon transmitter and the second unique identifier of the mobile communications device;
querying information corresponding to the first unique identifier including information regarding engagement of the user and the web link directed to Internet content from the at least one database;
updating in the at least one database the information regarding engagement of the user using a numerical point value associated with the wireless beacon transmitter, the numerical point value being calculated into the information regarding engagement of the user to result in one of a positive value or negative value for the information regarding engagement of the user, the positive value representing that the user is willing to remain in the educational institution, and the negative value representing that the user is in danger of dropping out of the educational institution; and
returning information corresponding to the first unique identifier including the web link directed to Internet content to the mobile communications device of the user automatically in response to the received signal strength of the wireless data signal being greater than or equal to the predetermined threshold received signal strength, wherein the returned web link is prevented from modification by the user.

* * * * *